US005963853A

United States Patent [19]

Berg et al.

[11] Patent Number: 5,963,853

[45] Date of Patent: Oct. 5, 1999

[54] METHOD AND ARRANGEMENT RELATING TO A TELECOMMUNICATION SYSTEM

[75] Inventors: Jan-Erik Berg; Magnus Almgren, both of Sollentuna, Sweden

[73] Assignee: Telefonaktiebolaget LM Ericsson, Stockholm, Sweden

[21] Appl. No.: 08/791,558

[22] Filed: Jan. 31, 1997

[30] Foreign Application Priority Data

Feb. 2, 1996 [SE] Sweden ................................ 9600393

[51] Int. Cl.[6] ...................................................... H04Q 7/20

[52] U.S. Cl. ............................. 455/77; 455/90; 455/550; 455/575; 343/702

[58] Field of Search ............................. 455/90, 403, 550, 455/575, 77, 63, 129, 504, 506; 343/702, 861, 862

[56] References Cited

U.S. PATENT DOCUMENTS

| | | | |
|---|---|---|---|
| 4,890,114 | 12/1989 | Egashira | 343/702 |
| 5,030,963 | 7/1991 | Tadama | 343/702 |
| 5,337,061 | 8/1994 | Pye et al. | 343/702 |
| 5,467,097 | 11/1995 | Toko | 343/702 |
| 5,541,610 | 7/1996 | Imanishi et al. | 343/702 |
| 5,689,821 | 11/1997 | Shimazaki | 343/702 |
| 5,710,984 | 1/1998 | Millar et al. | 455/90 |

*Primary Examiner*—Dwayne D. Bost
*Assistant Examiner*—Nay A. Maung
*Attorney, Agent, or Firm*—Burns, Doane, Swecker & Mathis, L.L.P.

[57] ABSTRACT

A radio communications unit that has a casing includes an antenna that is connected to a signal processing unit. A metal object is placed in the casing and connected to an impedance. The antenna receives a radio signal which has repeating fading moments where the signal strength C is exceedingly low. The signal processing unit includes a unit for controlling a switch and impedance unit. In their simplest form, these control devices are manual, although they may alternatively comprise devices that are integrated in the signal processing unit which controls the activation of the metal object and the impedance with control signals. When the antenna is situated in a fading minimum, the metal object is either connected to or disconnected from the impedance unit, resulting in new signal reflections that cause the fading minimum to be moved away from the antenna.

23 Claims, 8 Drawing Sheets

METHOD AND ARRANGEMENT RELATING TO A TELECOMMUNICATION SYSTEM

BACKGROUND

The invention relates to arrangements and methods in the field of radio communications, and is particularly concerned with the transmission and reception of radio signals that are encumbered with fading.

In order for radio communication between a transmitter and a receiver to function, a basic requisite is that the amplitude of the varying electromagnetic field (the signal) generated by the transmitter is sufficiently strong in relation to the natural signal noise level in the receiver for the receiver to detect the signal. It is possible to distinguish between three different phenomena that weaken the radio signal on its path from transmitter to receiver.

Firstly, the signal may be weakened due to the distance between the transmitter and receiver; the longer the distance, the weaker the signal received by the receiver. Secondly, the signal may also be weakened by shadowing objects in the path of the signal, such as natural formations and building structures. Thirdly, the signal transmitted by the transmitter may be weakened as it approaches the receiver by reflections against a number of reflecting surfaces. Depending on the difference in total distance between transmitter and receiver with respect to the various reflected signals, these signals will coact (interfere) more or less destructively and, in the worst case, cancel out each other and therewith give rise to a minimum in the interference pattern that has manifested at the receiver site. For instance, when considering the case of two interfering signals whose wavelength difference is one-half the signal wavelength, the signal will be completely extinguished. If the surroundings of the transmitter and the receiver change so as to cause the reflection conditions to change constantly, for instance because the receiver is mobile, this interference will be observed on the receiver side as so-called fading moments. Alternatively, the problem can be described by saying that the receiver is located in a fading minimum. Depending on the signal wavelength in relation to the rate at which the surroundings change, the state of these fading minima will vary spatially and also in time. For instance, fading moments occur with a typical length of one tenth of a second when the wavelength is 0.33 m (corresponding to a frequency of 900 MHz) and the relative speed between transmitter and receiver is a typical walking speed of some km/h. If the receiver remains stationary when it has reached a fading minimum, the received signal may fail to appear for a much longer time.

The problem of fading in radio reception has earlier been solved with the aid of so-called diversity arrangements. In principle, this solution has involved connecting to a radio receiver two or more antennas whose mutual position has caused the signal environment to be different for respective antennas. This is utilized in the diversity receivers by utilizing the strongest signal from one antenna, or by using a combination of the signals for more than one of said antennas.

JP 59-72831 proposes a solution to the fading problem. There is described a diversity radio receiver which includes two separate receiver antenna that are connected to a receiver unit which includes a diversity function. The signal strengths from the two antennas are compared continuously and the antenna that receives the strongest signal at that moment in time delivers the signal to the actual receiver unit.

U.S. Pat. No. 5,361,404 describes a diversity receiver which is equipped with at least two antennas. With the intention of reducing the fading effect, the signals from these antennas are combined with the aid of a control unit. The control unit controls amplification and phase-shifting of the signals from the different antennas, wherein the optimal signal may be either the signal from one of the antennas or a weighted sum of the signals from several of the antennas.

U.S. Pat. No. 5,191,598 proposes a method of reducing the effects of fading in a radio communications system. In a receiver having at least two receiver antennas, the transmission functions of respective channels in which the antennas are included are assessed with the aid of a signal processing unit. These assessments of the transmission functions are then used in a Viterbi algorithm to recreate the ideal input signal.

The drawbacks with solutions of this type is that they include complicated arrangements with combinations of hardware and software that measure and compare the signal strength of two or more antennas.

SUMMARY

The present invention solves the aforedescribed problem. The negative effects that occur when an antenna falls in a minimum in the interference pattern that occurs in surroundings that include radio signals reflecting surfaces are reduced.

The invention eliminates the aforedescribed fading moments, by enabling a change to be effected in the electrical environment of the antenna in a radio communications unit, which may function both as transmitter and receiver. An electrically conductive object which is free-standing in relation to the antenna is caused to reflect a signal with a not-negligible phase difference with respect to the signal received by the antenna or transmitted thereby. This results in a change in the interference pattern and in that the minimum is shifted to a position on one side of the radio communications unit. This applies irrespective of whether the receiving antenna is the antenna in the radio communications unit or is, e.g., a receiving antenna in a base station of a mobile radio system. Thus, the invention has the same effect as that obtained by moving the receiving antenna.

The electrically conductive object is thus mounted in the proximity of the antenna and can be switched to and from signal earth or an impedance with the aid of switch means provided to this end. The use of a variable impedance enables the phase with which the electrically conductive object reflects the signal to vary, which in turn enables an optimal phase difference to be set so as to move the interference minimum away from the antenna. Alternatively, two electrically conductive objects may be mutually connected by switch means.

This arrangement including the reflective object is then placed in a larger setting, inasmuch that the arrangement is included in a mobile radio system that includes a base station and a mobile station. Consider the first situation solely from the perspective of the mobile station. One prerequisite is that the mobile station is able to process and analyze the incoming radio signal in a signal processing unit and that said unit is able, with the aid of control signals, to control setting of the switch means with respect to the electrically conductive object and also with respect to the value of the impedance to which the object is connected. As the strength of the signal received in the mobile station varies as a result of the varying interference pattern, the signal processing unit sends control signals to the control circuits in the switch means and the impedance. This results in activation and deactivation of the impedance and also sets the impedance value required for the electrically conductive object to reflect the radio signal with a phase shift that is sufficient to obtain the greatest possible signal strength in the receiver.

In the reverse case, the base station discovers that its receiver antenna is situated in an interference minimum in the signal pattern that has been generated by the mobile station. Provided that the base station is able to process and analyze the signal strength, the base station is able to inform the mobile station to this effect and to ask, via a separate control channel for instance, for the mobile station to activate or deactivate the electrically conductive object with a suitable impedance and therewith change the interference pattern so as to move the interference minimum away from the base station receiving antenna.

Thus, one intention with the invention is to provide a simple arrangement which includes an electrically conductive object that is able to change the interference pattern in the surroundings of a radio communications unit such that the unit will not be situated in a minimum.

The invention affords the advantage that the electrically conductive object and its switching unit and possible impedance unit is a structurally very simple arrangement. The object may be free-standing with respect to the radio communications unit although activation and deactivation of the object is controlled from said unit. The electrically conductive object used may, for instance, be part of the casing of the radio communications unit as well as being a part which is completely free-standing with respect to said casing. It is not necessary to connect two or more antennas to the radio communications unit, as in the case of earlier solutions. Thus, a problem which would otherwise require more complicated solutions that utilize transmitters and receivers that have diversity functions is solved with the aid of a few simple components.

DETAILED DESCRIPTION

Figure 3A:
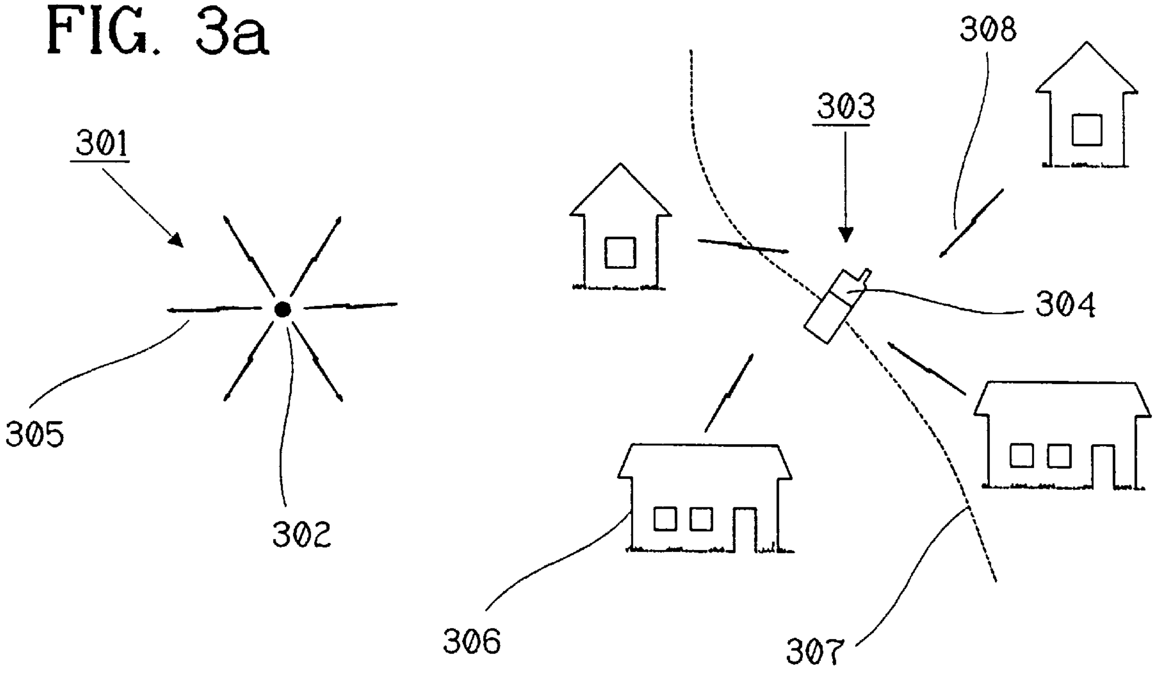
FIG. 3*a* is a perspective view of a mobile radio system.
Figure 3B:
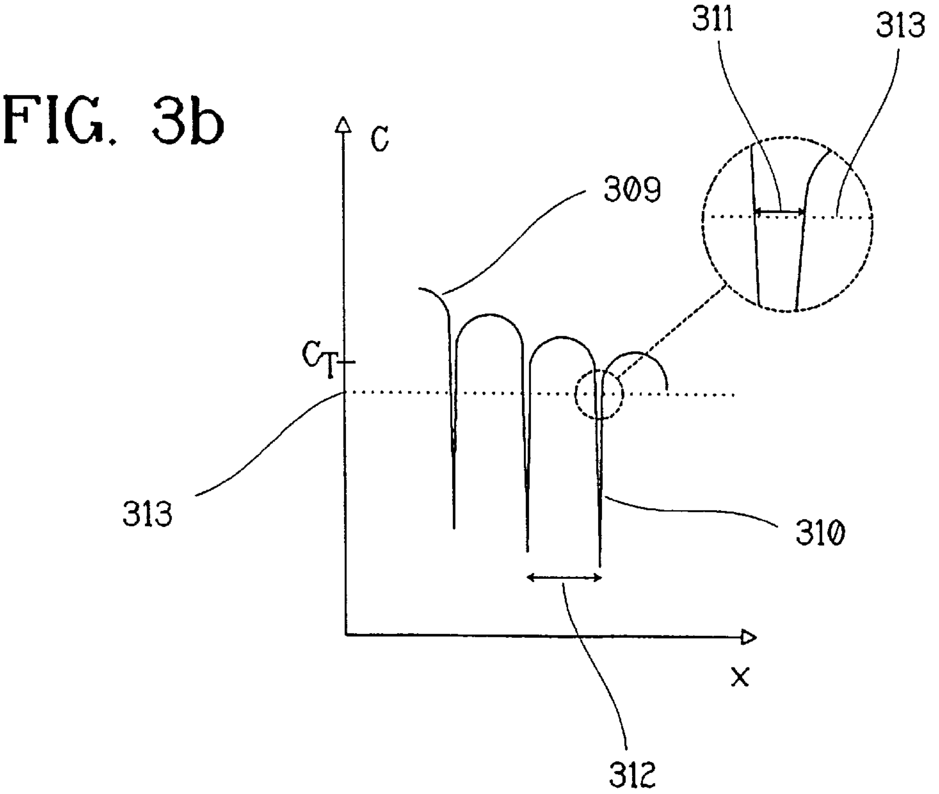
FIG. 3*b* is a signal strength diagram showing a fading phenomenon.

FIG. 3*a* illustrates a mobile radio system comprising a base station 301 having a transmitter 302, and a mobile station 303 having a receiver 304. The transmitter 302 transmits a signal 305 of given wavelength. The mobile station 303 and its receiver 304 are situated in an area which includes several radio wave reflecting surfaces. In the illustrated example, these surfaces have the form of buildings 306, although they may also include natural formations, etc. The mobile station 303 moves in a path 307 at a not-negligible speed. The transmitted signal 305 is reflected by the buildings 306 before reaching the receiver 304 in the mobile station 303. Because the receiver 304 is reached by signals 308 that have been reflected by surfaces spaced at different distances apart, the signals are more or less out of phase with one another. The resultant signal strength C from these phase-shifted signals 308 is minimal at certain places along the path 307 of the mobile station 303 through its surroundings, and in the worst of cases the resultant signal 309 may be totally extinguished. FIG. 3*b* illustrates an example of how the signal strength C of the resultant signal 309 can vary in the environment depicted in FIG. 3*a*. The diagram shows the strength of the signal 309 at the receiver 304 (in logarithmic scale) as a function of a distance X along the path 307. A number of narrow fading minima 310 can be seen. The character of these minima (mutual distance 312 and breadth 311) is determined by the wavelength of the carrier wave of signal 309 and the bandwidth of the signal 309. One decisive parameter is the magnitude of the width 311 of the fading minima 310 at a given threshold level 313 of the signal strength C. If this breadth is excessive in relation to the speed at which the mobile station and its receiver 304 move, a fading moment of significant extension in time can occur, making communication in the system difficult.

Figure 1A:
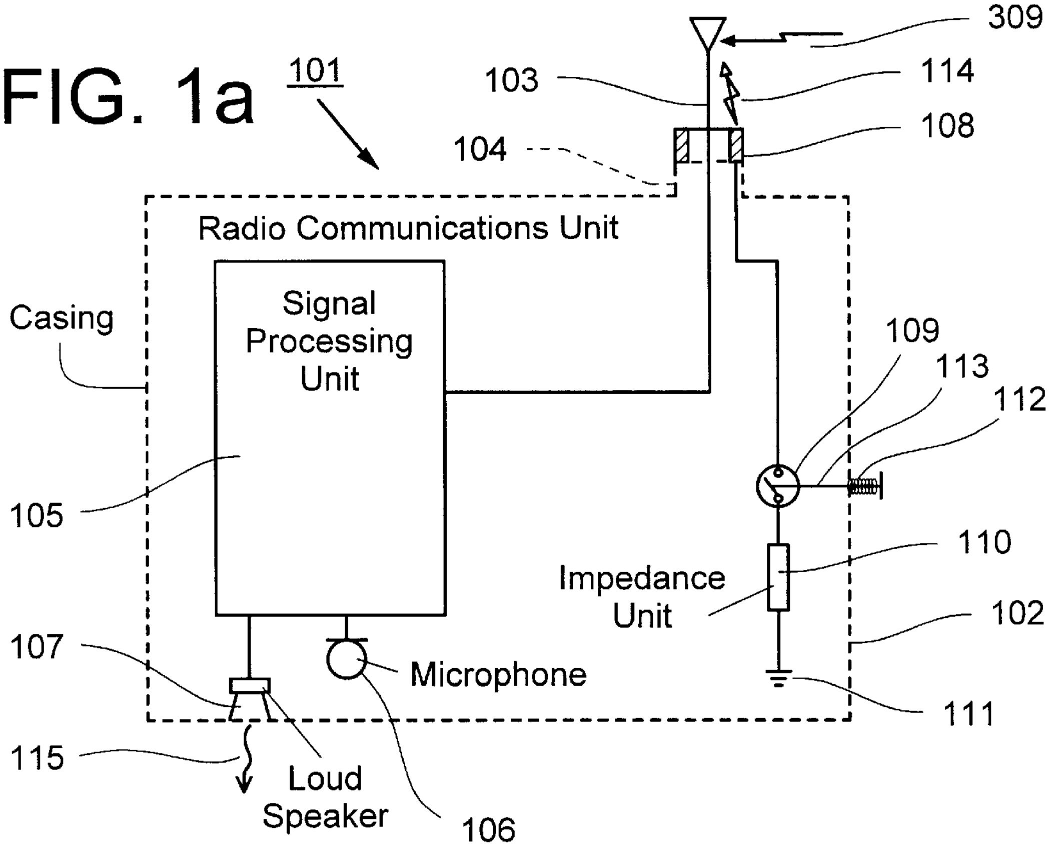
FIG. 1*a* is a block diagram which illustrates a first embodiment of a radio communications unit.

FIG. 1*a* illustrates a radio communications unit 101 housed in a casing 102. An antenna 103 is mounted through a fitting 104 in the casing 102 and is connected to a signal processing unit 104 to which a microphone 106 and a loudspeaker 107 are also connected. An electrically conductive object 108 in the form of a metal ring is mounted on the antenna fitting 105 concentrically with the antenna 103 but out of electrical contact therewith. The object 108 is connected to signal earth 111 of the radio communications unit 101 by switch means 109 and via an impedance unit 110. The impedance of this impedance unit 110 also includes the value zero (i.e. short-circuited to signal earth 111). The switch 109 is operated by a push-button mechanism 113 which includes a spring 112 and which is mounted on the outer side of the casing 102 and accessible therefrom.

The radio signal 309 is captured by the antenna 103 and is processed in the signal processing unit 104 so as to be heard as acoustic signals 115 in the loudspeaker 107. In the illustrated case, the invention is utilized in a manner such that when the signal 115 leaving the loudspeaker 107 is weakened in a way which indicates to the user that the antenna 103 is situated in a fading minimum 310, the electrically conductive object 108 is switched either to or from signal earth 111 with the aid of the push-button switch means 109 This results in a change in a signal 114 reflected from the electrically conductive object 108 (schematically shown) onto the antenna 103 and in a shift in the position of the fading minimum 310. It should be noted that activation and deactivation of the electrically conductive object 108 may contribute towards the occurrence of a fading minimum 310 at the antenna 103 instead, in that case when the antenna 103 at the time of activation or deactivation is not situated in a fading minimum. However, it is precisely this phenomenon, which can be designated artificial fading, that illustrates the physical mechanism of the invention, to wit the change in the electrodynamics environment in the proximity of the antenna 103.

Figure 1B:
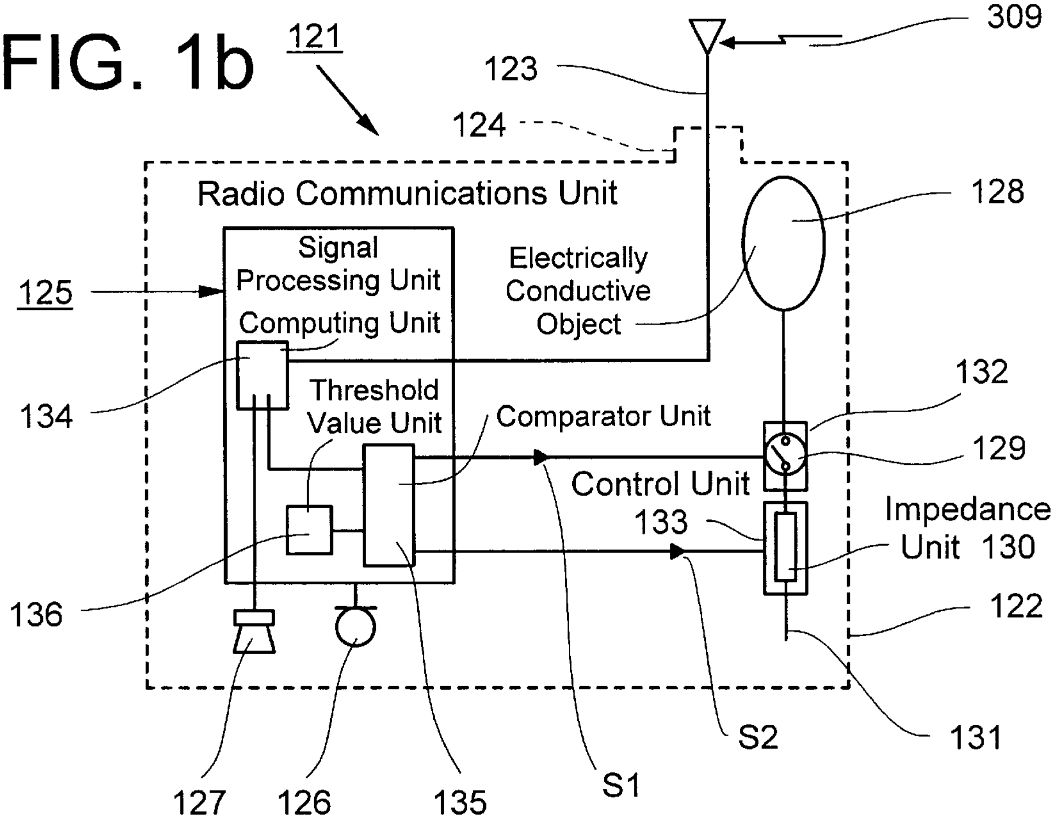
FIG. 1*b* is a block diagram which illustrates a second embodiment of a radio communications unit.

FIG. 1*b* illustrates an alternative embodiment of the invention. In this embodiment, the radio communications unit 121 has an antenna 123 which protrudes out from the unit casing 122 and which is attached in the casing through the medium of an antenna attachment 124. The antenna 123 is connected to a signal processing unit 125, to which a microphone 126 and a loudspeaker 127 are also connected. An electrically conductive object 128 is mounted inside the casing 122, but separate therefrom. In the FIG. 1*b* embodiment, the object 128 has the form of an oval metal plate, although it may, of course, comprise other electrically conductive materials and shapes, such as different rectangular shapes, curved shapes or bent shapes. An impedance unit 130 that has a continuously variable impedance is connected to the electrically conductive object 128 through the medium of a switch means 129. Each of the switch means 29 and the impedance unit 130 is connected to the signal processing unit 125 through the medium of a respective control unit 132, 133. The switch means control unit 132 converts a control signal S1 from the signal processing unit 125 into a switch on and off signal. The impedance unit control unit 133 converts a control signal S2 from the signal processing unit 125 into a signal for changing the impedance level in the impedance unit 130, which in turn alters the electrodynamic environment in the proximity of the antenna 123. As shown in FIG. 1*b*, it is not necessary to bring the electrically conductive object 128 into contact with signal earth in order to change the electrodynamics environment. In the illustrated case, the end 131 of the impedance unit lies distal from the switch means 129 is thus not connected to anything.

One difference between this second embodiment of the invention and the embodiment first described with reference to FIG. 1*a* is that activation of the electrically conductive object 128 is controlled by the signal processing unit 125. In accordance with methods or procedures later described, connection of the electrically conductive object 128 with the impedance in the impedance unit 130 is effected on the basis of a quality analysis of the input signal 309, through the medium of the connections to respective control units 132, 133, The quality of the signal 309 incoming to the antenna 123 is computed in the quality computing unit 134 and then compared in a comparitor unit 135 with a threshold value stored in a threshold value unit 136. In this example, signal strength C is used to decide the quality of the signal. The stored threshold value is the value $C_T$ in FIG. 3*b*. This value $C_T$ has been chosen to be higher than the fading threshold level 313, so as to obtain good quality signal transmission. The so-called C/I ratio is another measurement of signal quality, this ratio being defined as the ratio between the desired signal level and the undesired (interfering) signal level. It is possible to use this ratio in the comparitor unit 135 in the same way as signal strength C, and there compare the ratio with a C/I threshold value. In digital systems, there is often calculated a bit error rate, which is a measurement of the magnitude of erroneously transmitted information between transmitter and receiver. The bit error rate is thus also a suitable measurement of signal quality.

The comparitor unit 135 makes the comparison between signal quality and threshold value. When the comparison shows the quality to be poorer than the threshold value, the control signals S1 and S2 are generated in the comparitor unit 135. The control signal S1 includes control commands relating to switching on and switching off the switch 129 and also to the time intervals at which the switch shall be switched on and off. In analogue radio communications systems, these time intervals are varied within the framework of the time extension of the fading moment. In digital time-divided radio communications systems, in which information is transmitted in bursts, there is introduced a limitation with regard to the time intervals between switching on and off the switch means. These time intervals are synchronised with the bursts in the signal processing unit 125. The control signal S2 includes the impedance value to which the impedance unit 130 shall be set. The impedance value, which is a complex value including amplitude and phase shift, is in the order of magnitude of the characteristic impedance of the electrically conductive object 128 with wide variations in respect of both phase shift and amplitude. In digital time-divided systems, it is also necessary to synchronise this control signal S2 with the bursts, with the aid of the signal processing unit 125.

The control signals S1 and S2 are then sent to the switch means control unit 132 and the impedance unit control unit 133 respectively. The control signal S1 results in the switch means control unit 132 resetting the switch 129. The control signal S2 results in the impedance unit control unit 133 setting the impedance of the impedance unit 130 to the value generated in the comparitor unit 135.

Figure 1C:
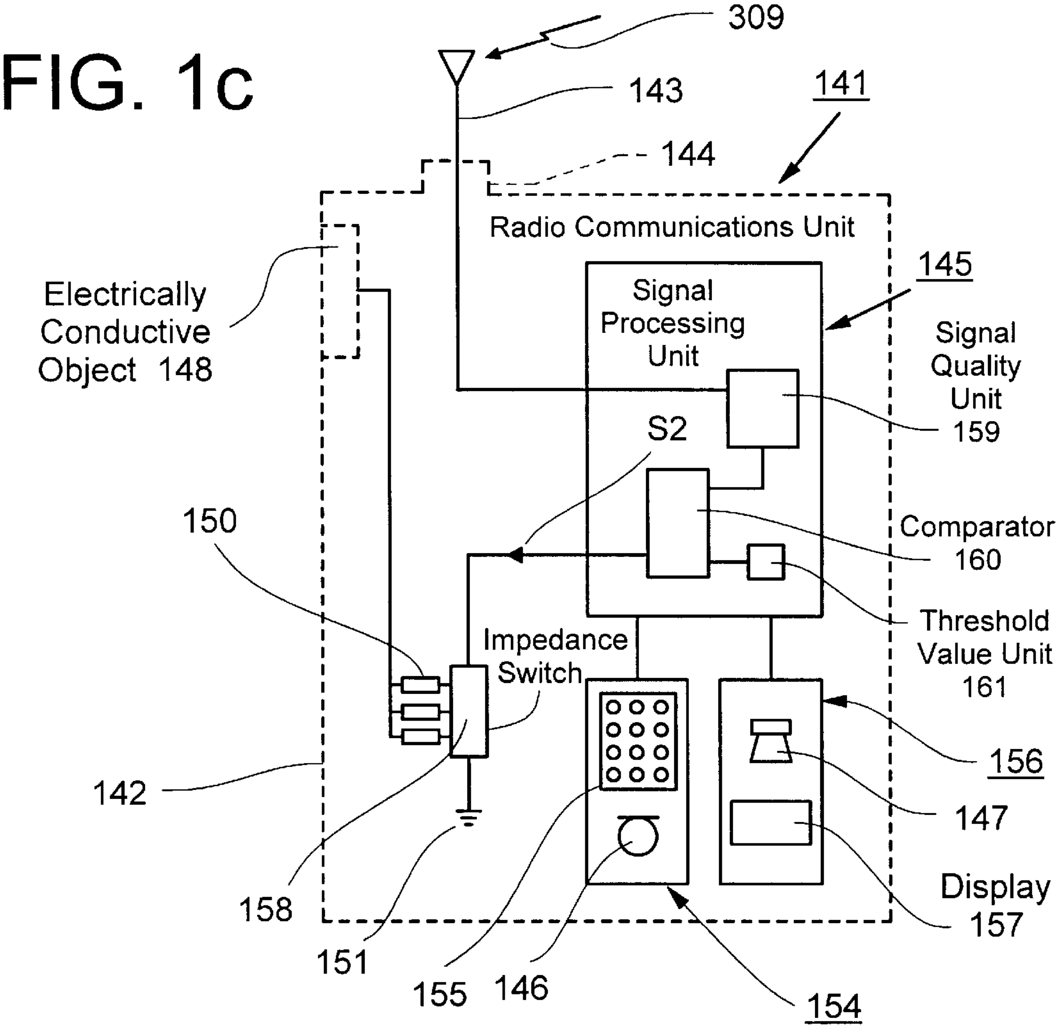
FIG. 1*c* is a block diagram which illustrates a third embodiment of a radio communications unit.

FIG. 1*c* illustrates an embodiment of the invention in which a radio communications unit 141 has an antenna 143 which, similar to the aforedescribed embodiment, is connected to a signal processing unit 145. There is connected to the signal processing unit 145 an input data unit 154 which includes a microphone 146 and a keypad 155, and an output data unit 156 which includes a loudspeaker 147 and a display 157. As with the earlier embodiments, an electrically conductive object 148 is connected to signal earth 151. This embodiment differs from the previous embodiments by virtue of the fact that in this case said connection is made through an impedance switch 158. The impedance switch 158 is controlled by the signal processing unit 145, which switches a number of the impedance units 150 in the circuit from the object 148 to signal earth 151.

The FIG. 1*c* embodiment also differs from the embodiments of FIGS. 1*a* and 1*b* by virtue of the fact that in this case an electrically conductive object 148 is an integral part of a casing 142 of the radio communications unit 141. Similar to the embodiment illustrated in FIG. 1*b*, the signal processing unit 145 functions to control the impedance 150 on the basis of an analysis of the quality of the incoming signal 309. Similar to the signal processing unit 125 described with reference to FIG. 1*b* above, the signal processing unit 145 of the FIG. 1*c* embodiment includes the unit 159 which determines the signal quality and a comparitor unit 160 with its associated threshold value unit 161. In this embodiment, the control signal S2 has a different function to the earlier function. Instead of controlling the impedance 130 continuously as in the case of the embodiment in FIG. 1*b*, the impedance 150 is controlled in discrete steps through the medium of the impedance switch 158. This embodiment also includes the functions carried out by the signal processing unit 145, i.e synchronisation of the switching and controlling impedance with the signal bursts when the radio communications unit 141 is used in a digital time-divided radio communications system.

Figure 1D:
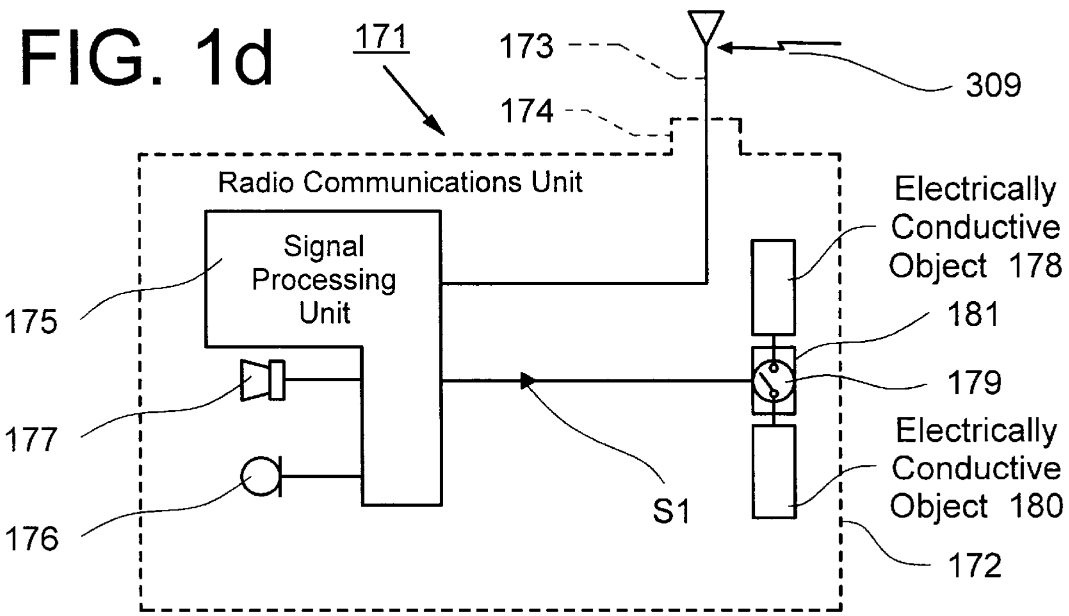
FIG. 1*d* is a block diagram which illustrates a fourth embodiment of a radio communications unit.

FIG. 1*d* illustrates another embodiment of the invention. As in the earlier embodiments, a radio communications unit 171 includes a casing 172, an antenna 173 which extends through an antenna attachment 174, a signal processing unit 175 and a microphone 176 and loudspeaker 177 connected to the unit. The embodiment according to FIG. 1*d*, however, differs from the embodiments earlier described by virtue of the fact that the signal processing unit 175 controls a switch means 179 through the medium of a control unit 181. This switch means 179 mutually couples two electrically conductive objects 178, 180 in response to a control signal S1 sent by the signal processing unit 175 to the control unit 181 of switch 179, subsequent to analyzing the quality of incoming signal 309.

It will be evident from the four embodiments described above that the electrodynamics environment in the proximity of an antenna 103, 123, 143, 173 can be changed in several different ways. FIGS. 6*a–k* are schematic sketches outlining a number of possible configurations of electrically conductive objects 601, 604, switch means 602, impedance units 605, 606 and their connections to signal earth 603 and freely-hanging ends 607.

Figure 6:
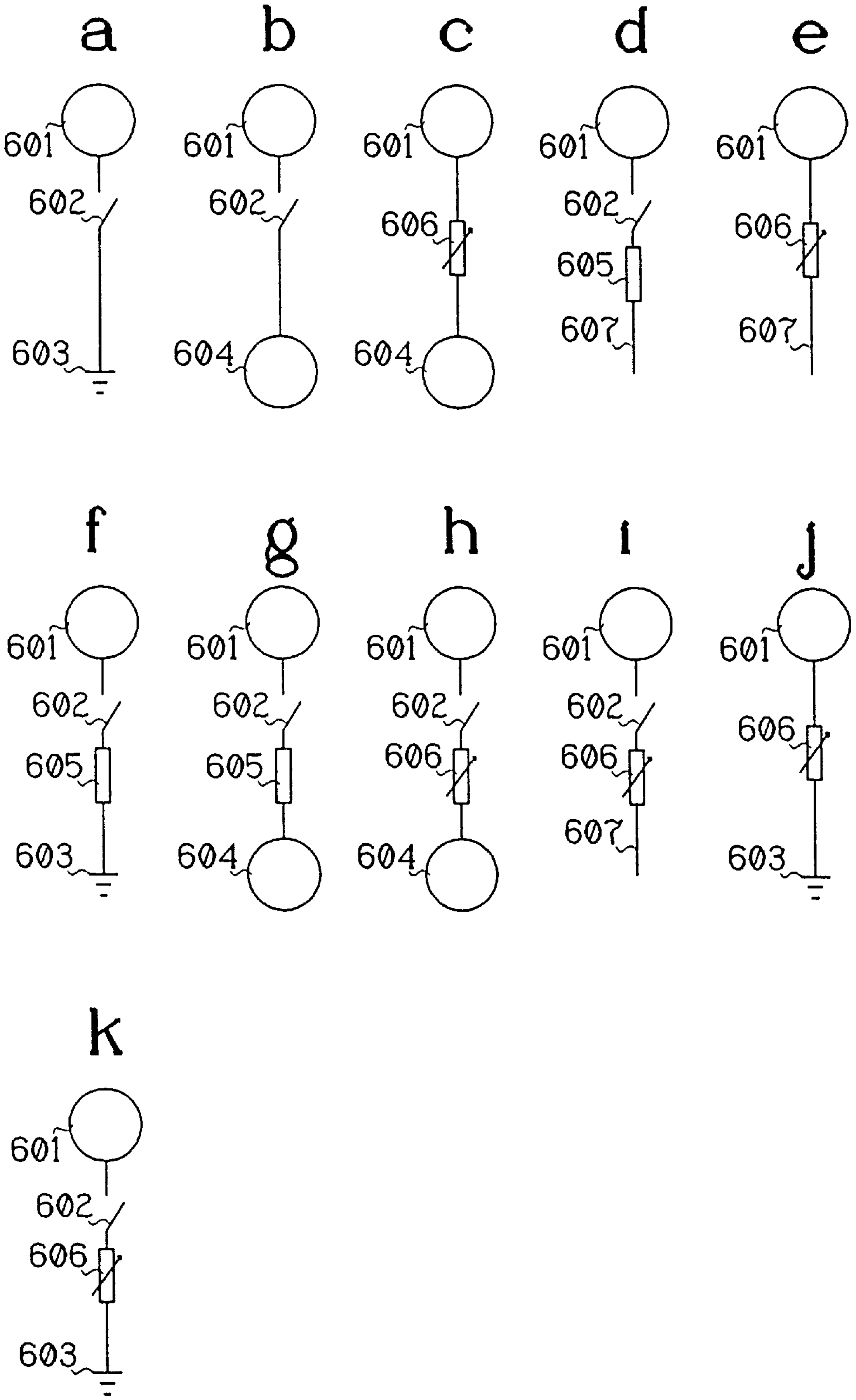
FIGS. 6*a–k* illustrate different inventive arrangements.

FIG. 6*a* illustrates the electrically conductive object 601 that is connected to and disconnected from signal earth 603 by the switch means 602. FIG. 6*b* illustrates the two electrically conductive objects 601, 604 that are mutually connected by the switch means 602. FIG. 6*c* illustrates the two electrically conductive objects 601, 604 that are mutually connected by the switch means 602 through the medium of the variable impedance unit 606. FIG. 6*d* illustrates the electrically conductive object 601 that is terminated with the impedance unit 605 which is connected to and disconnected from the object 601 by the switch means 602. FIG. 6*e* illustrates the electrically conductive object 601 that is connected with the variable impedance unit 606. FIG. 6*f* illustrates the electrically conductive object 601 that is connected to and disconnected from signal earth 603 by the switch 602 through the medium of the impedance unit 605. FIG. 6*g* illustrates the two electrically conductive objects 601, 604 that are mutually connected by the switch means 602 through the medium of the impedance unit 605. FIG. 6*h* illustrates the two electrically conductive objects 601, 604 that are mutually connected by the switch 602 via the variable impedance unit 606. FIG. 6*i* illustrates the electrically conductive object 601 that is terminated with the variable impedance unit 606 which is connected to and disconnected from the object 601 by the switch 602. FIG. 6*j* illustrates the electrically conductive object 601 that is connected to and disconnected from signal earth 603 via the variable impedance unit 606. FIG. 6*k* illustrates the electrically conductive object 601 that is connected to and disconnected from signal earth 603 by the switch 602 via the variable impedance unit 605.

Figure 2A:
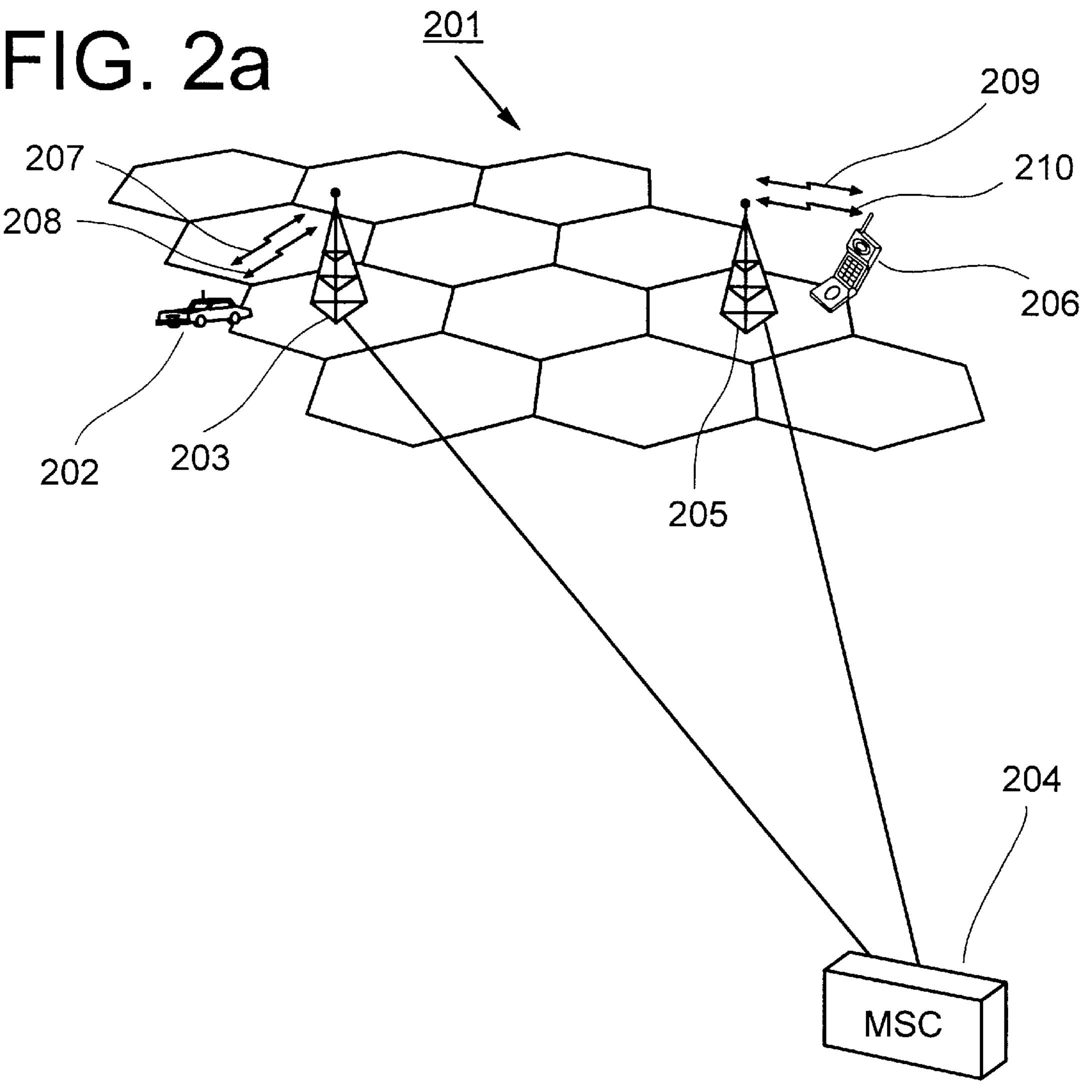
FIG. 2*a* is a perspective view of a mobile radio system.
Figure 4:
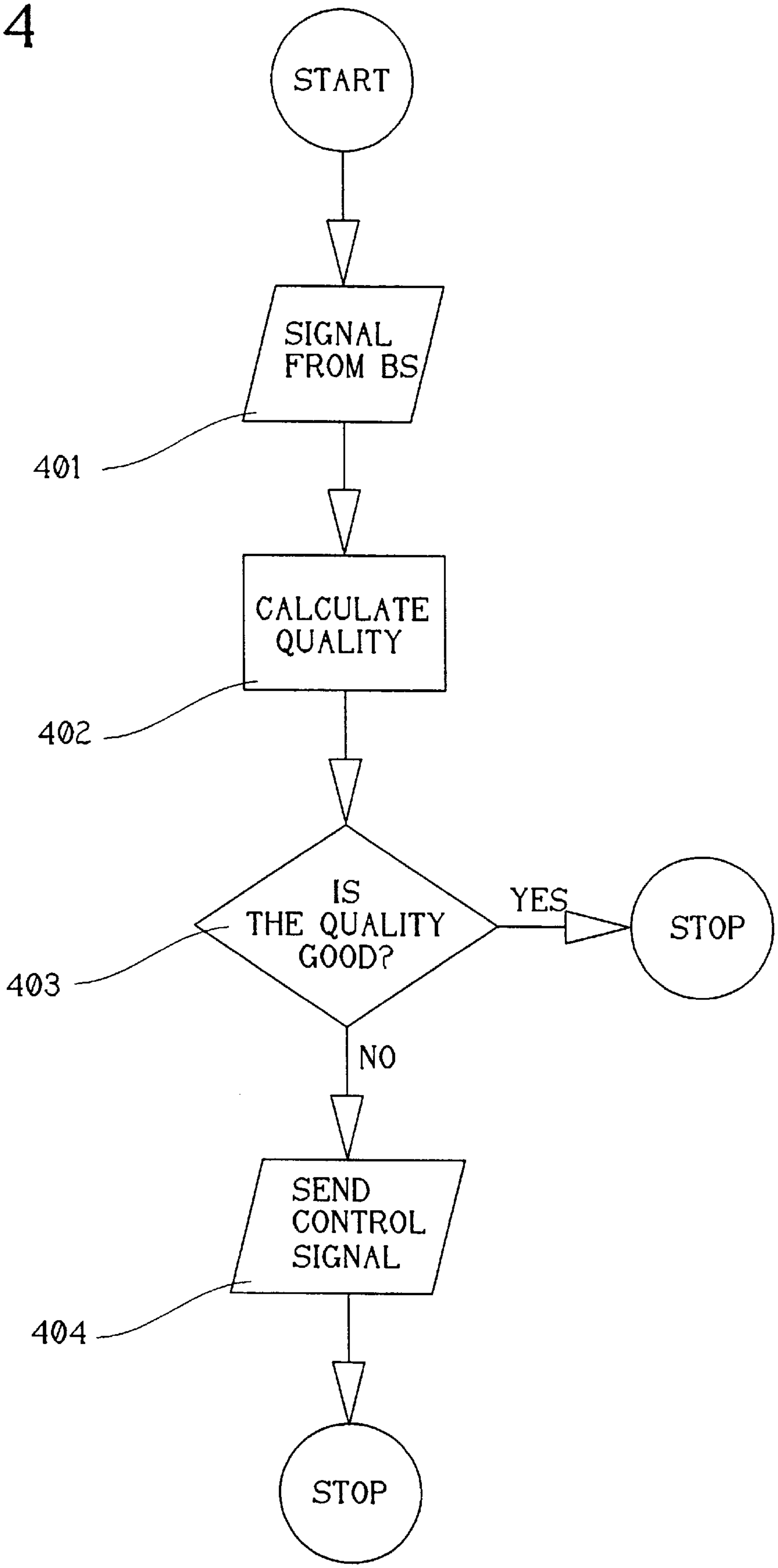
FIG. 4 is a flowchart illustrating a method of radio communication.
Figure 5A:
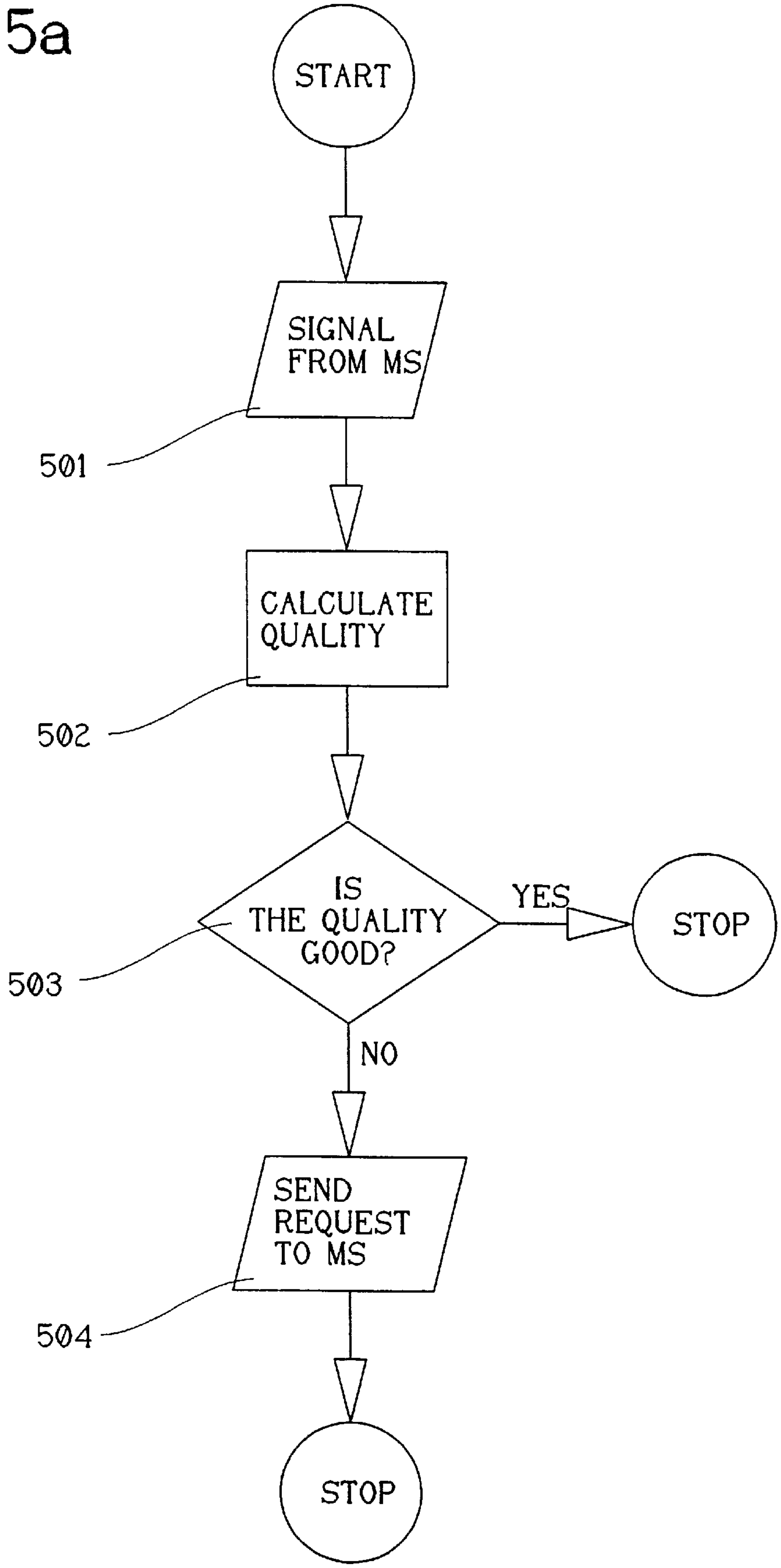
FIGS. 5*a* and 5*b* are flowcharts illustrating an alternative method of radio communication.
Figure 5B:
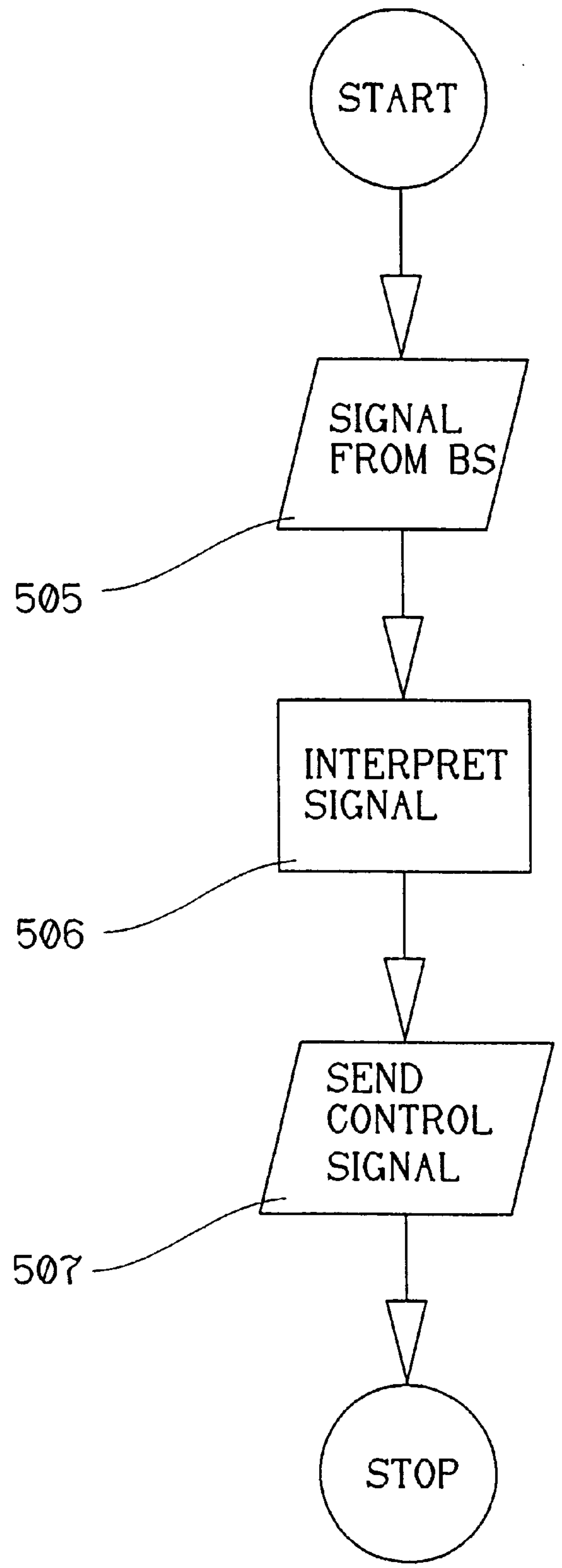

FIGS. 4, 5*a* and 5*b* are flowcharts which illustrate an inventive method for radio communication in a mobile radio system 201, shown in FIG. 2*a*. FIG. 2*a* illustrates the mobile radio system 201 having base stations 203, 205 connected to a mobile telephone switching centre 204. One base station 203 has contact with a mobile station 202 via a traffic channel 207 and a control channel 208. The other base station 205 has contact with a second mobile station 206, via a traffic channel 209 and a control channel 210.

Figure 2B:
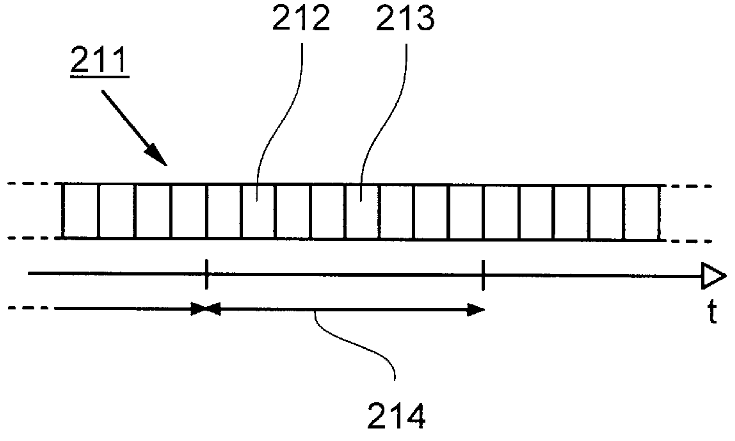
FIG. 2*b* is a time diagram in a radio communications system including time slots.

The inventive method requires the mobile stations 202, 206 to include those units described above with reference to FIG. 1*b*. The signals between the base stations 203, 205 and respective mobile stations 202, 206 may be modulated speech signals in the traffic channels 207, 209, and the mobile radio system 201 may either be an analogue or digital system. The channels may also be separate control channels 208, 210 (analogue or digital) intended for monitoring the signal quality in the system, for instance. FIG. 2*b* illustrates schematically an example of the principle applied in a digital time-divided multiple access system (TDMA) 211. A traffic channel utilizes one time slot 212 and a control channel utilizes another time slot 213 in a time slot frame 214. In an analogue system, corresponding channels utilize different frequencies. According to one alternative, a control channel 208 may be a limited part of the time slot 213 and therewith constitute a so-called associated control channel. FIG. 2*b* illustrates an example of a downlink from the base station 203 to the mobile station 202. An uplink, in the opposite direction, has schematically the same configuration as in FIG. 2*b*, but with the difference that the carrier frequency is different to the carrier frequency of the downlink.

The flowchart in FIG. 4 begins with a first stage 401 in the inventive method for which there is used a radio communications unit 121 according to FIG. 1*b*. This first stage is characterized by the reception of the signal 309 from the base station 205, in the mobile station 206. In the next stage 402, the received signal 309 is analyzed and the quality of the signal quantified, for instance by determining the signal strength C. The signal quality measurement obtained is then compared in a following stage 403 with a predetermined threshold value, which may be the threshold value $C_T$ shown in FIG. 3*b*. If this comparison shows the signal quality be good, no further processing is carried out within the framework of the invention. On the other hand, if the signal quality is below that represented by the threshold value $C_T$, rectifying procedures are carried out in the next following stage 404. The control signals S1 and S2 intended for controlling the switch 129 and the impedance unit 130 respectively are generated in parameters, as described above with reference to FIGS. 1*b* and 1*c*, for instance with impedance level and time intervals for the on-off settings of the switch 129. Stage 404 is terminated by the actual transmission of the control signals S1 and S2 to the switch 129 and the impedance unit 130 respectively.

FIGS. 5*a* and 5*b* describe a further method for radio communication in a mobile radio system 201, between the base station 205 and the mobile station 206 according to FIGS. 2*a* and 2*b*. It is also assumed in this case that the mobile station 206 includes the radio communications unit 121 illustrated in FIG. 1*b*. Although not shown, the base station 204 also includes a signal processing unit with devices similar to those of the radio communications unit 121; quality determining unit 134, comparator unit 135 and threshold value unit 136. This method includes a feedback function between the system base station 205 and the system mobile station 206. The base station 205 receives the signal from the mobile station 206 on the uplink, in the first stage 501. As in the above example, the signal may be a modulated speech signal in the traffic channel 209, either in an analogue mobile radio system or in a digital system, but may also be a separate channel, analogue or digital, intended for monitoring signal quality in the system. In the next stage 502, the received signal is analyzed in the signal processing unit (not shown) of the base station 205, resulting in quantification of the quality of the signal. The obtained signal quality measurement is then compared with a predetermined threshold value in the next stage 503. When the comparison shows good signal quality, no further processing is carried out within the framework of the invention. On the other hand, if the signal quality is below the quality represented by the threshold value, rectifying procedures are carried out in a following stage 504. A request from the base station 205 with respect to rectifying procedures from the mobile station side is generated and then sent to the mobile station 206. In the illustrated example, this is carried out through the downlink of the control channel 210, which may be analogue or digital similar to the aforesaid. In stage 505, the signal in this control channel 210 is received by the mobile station 206, which, in response thereto, introduces the sequence of functions illustrated in FIG. 5*b*. In the next stage 506, the received signal is interpreted with the request of the base station 205 for rectifying procedures, and carries out these procedures in the following stage 507. As with the earlier embodiment, the control signals S1 and S2 intended for controlling the switch 129 and the impedance unit 130 are generated in, e.g., parameters such as impedance level and time intervals at which the switch 129 shall be switched on and off. Finally, stage 507 ends with the actual transmission of the control signals S1 and S2 to the switch 129 and the impedance unit 130 respectively in the mobile station 206.

It will be evident from the aforedescribed embodiments that the invention can be applied irrespective of which communicating radio communication unit or units has/have a receiver which is situated in a fading minimum. It is possible that both receiving units are situated in different fading minima. In this case, a combination of the two methods described in FIGS. 4 and 5*a* and 5*b* respectively is appropriate in accordance with the invention. However, an important requisite in precisely one such a situation is that the signal processing units in the radio communications units have functions which enable synchronisation of the activation/deactivation of the electrically conductive object when transmitting and receiving on uplink and downlink respectively.

It will be noted that no preference has been made in the above description of the preferred embodiments to any particular mobile radio system (GSM, NMT, AMPS, TACS, etc.) in which the invention may be suitably applied. This omission is intentional, since radio signals can be subjected to fading irrespective of the system in which the communication takes place. Furthermore, it will be understood that the invention can be applied in all general radio communications systems, including systems having permanent transmitter and receiver stations that can be subjected to fading just as well as a mobile radio system.

What is claimed is:

1. A radio communications unit which includes an antenna connected to a signal processing unit wherein the radio communications unit also includes an electrically conductive object which stands free from the antenna, and a switch means which is connected to the signal earth of the signal processing unit and to the electrically conductive object via an impedance unit, and wherein the switch means can be switched between an activating and a deactivating state and when switched alters the electrodynamic field in the proximity of the antenna.

2. A radio communications unit which includes an antenna connected to a signal processing unit, wherein the radio communications unit also includes at least two electrically conductive objects which stand free from the antenna and a switch means which is connected to the electrically conductive object, and wherein the switch means can be switched between activating and deactivating states and which when switched connects together pair-wise at least two electrically conductive objects, therewith alternating the electrodynamic field in the proximity of the antenna.

3. A radio communications unit comprising:

an antenna connected to a signal processing unit;

at least two electrically conductive objects which stand free from the antenna;

an impedance unit having a varying impedance level wherein the variation of said impedance level results in a change in the electrodynamic field in the proximity of the antenna; and a switch means having an activating and a deactivating state, said switch in an activating state connecting the conductive objects with said impedance unit.

4. A radio communications unit which includes an antenna connected to a signal processing unit, wherein the radio communication unit further includes an electrically conductive object which stands free from the antenna, and a switch means which is connected to the electrically conductive object and to an impedance unit, and wherein the switch means can be switched between an activating and a deactivating state and when switched connects together the electrically conductive object and the impedance unit, therewith to change the electrodynamics field in the proximity of the antenna.

5. A radio communications unit comprising:

an antenna connected to a signal processing unit;

an electrically conductive object which stands free from the antenna;

an impedance unit having a varying impedance level wherein the variation of said impedance level results in a change in the electrodynamic field in the proximity of the antenna, said impedance unit being connected to the conductive object; and a switch means having an activating and a deactivating state, said switch in an activating state connecting the conductive object with said impedance unit.

6. A unit according to claim 2, wherein at least one of the electrically conductive objects is connected to the switch means through an impedance unit.

7. A unit according to claim 5, wherein the electrically conductive object is connected to the signal earth of the signal processing unit via the impedance unit.

8. A unit according to claim 1, wherein the impedance of the impedance unit can be varied between different values, wherein variation of the impedance results in a change in the electrodynamic field in the proximity of the antenna.

9. A unit according to claim 3, wherein the impedance of the impedance unit has at least two selectable discrete values.

10. A unit according to claim 3, wherein the impedance of the impedance unit has continuously settable values in at least one predetermined impedance range.

11. A radio communications unit according to claim 1, wherein the unit has a casing, and at least one electrically conductive object constitutes a part of said casing.

12. A radio communications unit according to claim 1, wherein the unit has a casing, and at least one electrically conducting object is a device which stands free from the casing.

13. A unit according to claim 1, wherein the switch means is connected to the signal processing unit; and in that the signal processing unit includes control devices which control switching of the switch means between said activating and deactivating states.

14. A unit according to claim 1, wherein the impedance unit is connected to the signal processing unit; and in that the signal processing unit includes control devices which control the setting of the value of the impedance in the impedance unit.

15. A radio communications unit according to claim 3 further includes a unit for measuring signal quality and a comparator unit for making a comparison between said signal quality and a threshold value stored in a threshold value unit.

16. A method of radio communication using a radio communications unit that has an antenna connected to a signal processing unit, the method comprising the steps of:

placing in the radio communications unit an electrically conductive object in a manner such as to stand free from the antenna;

connecting the electrically conductive object to the signal earth of the signal processing unit via a switch means;

connecting an impedance unit between the electrically conductive object and the signal earth of the signal processing unit; and switching the switch means between states in which the signal earth of the signal processing unit is connected and disconnected respectively via the impedance unit, with the intention of influencing the electrodynamics field in the proximity of the antenna.

17. A method of radio communication in accordance with claim 16, further comprising the step of varying the impedance of the impedance unit between at least two discrete values.

18. A method of radio communication according to claim 16, further comprising the step of continuously varying the impedance of the impedance unit.

19. A method of radio communication in accordance with claim 17 further comprising the step of controlling variation of the impedance of the impedance unit in response to a control signal from the signal processing unit.

20. A method of radio communication in accordance with claim 16, wherein connection and disconnection of the electrically conductive object to and from signal earth is controlled by a control signal from the signal processing unit.

21. A method of radio communication in accordance with claim 19, wherein the procedural steps carried out in the signal processing unit include:

measuring the quality of a signal from the antenna, comparing the quality of the signal with a predetermined threshold value; and sending control signals to the switch means and the impedance unit with the intention of controlling switching of the switch means and setting the impedance of the impedance unit.

22. A method of radio communication between a base station and a mobile station in a mobile radio system, wherein the mobile station includes an antenna connected to a signal processing unit, the method comprising the steps of:

connecting to the signal processing unit a switch means with which an electrically conductive object that stands freely from the antenna is switched between a signal earth connecting and signal earth disconnecting mode;

connecting to the signal processing unit a variable impedance unit with which an electrically conductive object is connected to signal earth via the switch means; and in that the procedural steps carried out by the signal processing unit comprise:

measuring the quality of a signal from the base station;

comparing the measured signal quality with a threshold value;

switching between respective states in which the electrically conductive object is connected to signal earth and disconnected therefrom in accordance with the comparison, wherein switching between said states is effected in response to a control signal to the switch means; and setting the impedance in the impedance unit with which the electrically conductive object is connected to signal earth in accordance with said comparison, wherein setting of the impedance is effected in response to a control signal to the impedance unit.

23. A method of radio communication between a base station and a mobile station in a mobile radio system, wherein the mobile station includes an antenna connected to a signal processing unit, and wherein the base station measures the quality of a signal received from the mobile station, the method comprising the steps of:

connecting to the signal processing unit a switch means with which an electrically conductive object that stands free from the antenna can be switched between respective states in which the electrically conductive object is connected to and disconnected from the signal earth of the signal processing unit;

connecting to the signal processing unit a variable impedance unit through which the electrically conductive object is connected to the signal earth of the signal processing unit via the switch means; and in that those procedural steps carried out by the base station include measuring the quality of a signal from the base station;

comparing the measured signal quality with a threshold value;

sending to the mobile station in accordance with the comparison a signal which includes a request asking for the electrically conductive object to he connected to or disconnected from signal and further includes a request asking for the impedance in the impedance unit with which the electrically conductive object is connected to signal earth to be regulated; wherewith the procedural steps carried by the mobile station include processing the signal from the base station, including signal interpretation, wherein the result of said interpretation determines whether said further steps shall include connection or disconnecting the electrically conductive object to or from signal earth and also regulation of the impedance of the impedance unit with which the electrically conductive object is connected to signal earth;

switching between respective states in which the electrically conductive object is connected to and disconnected from signal earth, wherein switching between states is carried out in response to a control signal sent to the switch means; and setting the impedance of the impedance unit with which the electrically conductive object is connected to signal earth, wherein setting of the impedance is effected in response to a control signal to the impedance unit.

* * * * *